United States Patent
Mao et al.

(10) Patent No.: US 12,415,213 B2
(45) Date of Patent: Sep. 16, 2025

(54) RESOURCE RECOVERY METHOD AND RESOURCE RECOVERY SYSTEM OF DESULFURIZED ASH

(71) Applicants: INSTITUTE OF RESEARCH OF IRON AND STEEL, JIANGSU PROVINCE/SHA-STEEL, CO., LTD., Suzhou (CN); ZHANGJIAGANG HONGCHANG STEEL PLATE CO., LTD., Suzhou (CN); JIANGSU SHAGANG GROUP CO., LTD., Suzhou (CN)

(72) Inventors: Rui Mao, Suzhou (CN); Shendong Mao, Suzhou (CN); Fei Wang, Suzhou (CN); Hang Su, Suzhou (CN)

(73) Assignees: ZHANGJIAGANG HONGCHANG STEEL PLATE CO., LTD., Suzhou (CN); HANGSU SHAGANG GROUP CO., LTD., Suzhou (CN); INSTITUTE OF RESEARCH OF IRON AND STEEL, JIANGSU PROVINCE/SHA-STEEL, CO., LTD., Suzhou (CN)

( * ) Notice: Subject to any disclaimer, the term of this patent is extended or adjusted under 35 U.S.C. 154(b) by 250 days.

(21) Appl. No.: 17/766,218

(22) PCT Filed: Dec. 3, 2019

(86) PCT No.: PCT/CN2019/122680
§ 371 (c)(1),
(2) Date: Apr. 1, 2022

(87) PCT Pub. No.: WO2021/097912
PCT Pub. Date: May 27, 2021

(65) Prior Publication Data
US 2024/0100579 A1   Mar. 28, 2024

(30) Foreign Application Priority Data

Nov. 21, 2019   (CN) .......................... 201911151098.X (51) Int. Cl.
*B09B 3/40* (2022.01)
*B01D 53/50* (2006.01)
(Continued)

(52) U.S. Cl.
CPC .............. *B09B 3/40* (2022.01); *B01D 53/502* (2013.01); *B01D 53/80* (2013.01); *B01D 53/96* (2013.01);
(Continued)

(58) Field of Classification Search
CPC ......... B09B 3/40; B09B 3/70; B09B 2101/30; B09B 3/00; B09B 5/00; B01D 53/502;
(Continued)

(56) References Cited

FOREIGN PATENT DOCUMENTS

CN      202824084 U       3/2013
CN      104096707 A   *  10/2014
(Continued)

OTHER PUBLICATIONS

Patricia CÃ³rdoba, Status of Flue Gas Desulphurisation (FGD) systems from coal-fired power plants: Overview of the physic-chemical control processes of wet limestone FGDs, Dec. 26, 2014, Fuel 144, 274â286 (Year: 2014).*
(Continued)

*Primary Examiner* — Daniel Berns
*Assistant Examiner* — Joshua Maxwell Speer
(74) *Attorney, Agent, or Firm* — Muncy, Geissler, Olds & Lowe, P.C.

(57) ABSTRACT

A resource recovery method and a resource recovery system of desulfurized ash. The resource recovery method includes washing desulfurized ash with water, and performing solid-
(Continued)

liquid separation to obtain solid residues rich in calcium sulfite and calcium sulfate and a solution rich in calcium hydroxide; preparing the solution into desulfurization slurry; and roasting the solid residues under the action of a reducing agent to obtain flue gas rich in sulfur dioxide and residues rich in calcium oxide. Therefore, the recovery of sulfur and calcium in the desulfurized ash is realized, and no solid waste, liquid waste, gas waste, etc. are produced in the process.

9 Claims, 3 Drawing Sheets

(51) Int. Cl.
*B01D 53/80* (2006.01)
*B01D 53/96* (2006.01)
*B09B 3/70* (2022.01)
*B09B 101/30* (2022.01)
*C01B 17/50* (2006.01)
*C01F 11/08* (2006.01)
*C22B 1/16* (2006.01)

(52) U.S. Cl.
CPC .............. *B09B 3/70* (2022.01); *C01B 17/506* (2013.01); *C01F 11/08* (2013.01); *C22B 1/16* (2013.01); *B01D 2251/404* (2013.01); *B01D 2251/602* (2013.01); *B01D 2251/604* (2013.01); *B01D 2257/302* (2013.01); *B01D 2258/0283* (2013.01); *B09B 2101/30* (2022.01)

(58) Field of Classification Search
CPC .. B01D 53/80; B01D 53/96; B01D 2251/404; B01D 2251/602; B01D 2251/604; B01D 2257/302; B01D 2258/0283; B01D 53/501; B01D 53/78; B01D 53/48; C01B 17/506; C01F 11/08; C22B 1/16; F23J 2700/001; F23J 2900/01004; F23J 2900/01005; Y02P 10/20; F23G 7/00
See application file for complete search history.

(56) References Cited

FOREIGN PATENT DOCUMENTS

| | | | |
|---|---|---|---|
| CN | 104959018 A | | 10/2015 |
| CN | 105396455 A | * | 3/2016 .............. C01F 11/08 |
| CN | 108672472 A | | 10/2018 |
| CN | 109745842 A | | 5/2019 |
| CN | 110404936 A | | 11/2019 |
| JP | S60-22920 A | | 2/1985 |
| JP | H10-57930 A | | 3/1998 |

OTHER PUBLICATIONS

Translation of CN_104096707 (Year: 2014).*
Translation of CN_105396455 (Year: 2016).*
Patricia Cordoba, Status of Flue Gas Desulphurisation (FGD) systems from coal-fired power plants: Overview of the physic-chemical control processes of wet limestone FGDs, Dec. 26, 2014, Fuel 144, 274-286 (Year: 2014).*
Mei Wang, Shihui Jiang, Wanjing Jin, Zhixiao Wang, Shuai Qiao, "Study on Resource Utilization of Flue Gas Desulfurization Ash from Semi Dry Sintering", Proceedings of the Annual Academic Meeting of the Chinese Society of Environmental Sciences, 2015, Chapter 6, pp. 4092-4097, China.

* cited by examiner

RESOURCE RECOVERY METHOD AND RESOURCE RECOVERY SYSTEM OF DESULFURIZED ASH

CROSS REFERENCE TO RELATED APPLICATIONS

This application is a 35 U.S.C. § 371 National Phase conversion of International (PCT) Patent Application No. PCT/CN2019/122680, filed on Dec. 3, 2019, which claims the priority of Chinese Patent Application No. 201911151098.X, filed on Nov. 21, 2019, named "resource recovery method and resource recovery system of desulfurized ash", the entire contents of which are incorporated herein by reference. The PCT International Patent Application was filed and published in Chinese.

TECHNICAL FIELD

The present invention belongs to the technical field of metallurgical solid waste treatment, and relates to a resource recovery method and a resource recovery system of desulfurized ash.

BACKGROUND

Flue gas desulfurization technologies are mainly divided into a dry desulfurization technology, a semi-dry desulfurization technology and a wet desulfurization technology. Compared with the wet desulfurization technology, the dry desulfurization technology and the semi-dry desulfurization technology have the advantages of high desulfurization efficiency, short process flow; small floor area, low investment, etc. In particular, the semi-dry flue gas desulfurization technology is widely used in the flue gas desulfurization process of small and medium-sized generator sets and iron and steel sintering due to its more significant advantages.

Both the dry desulfurization technology and the semi-dry desulfurization technology will produce a desulfurized by-product, the desulfurized by-product is called desulfurized ash, and the main components of the desulfurized ash generally comprise: calcium sulfite, calcium sulfate, calcium oxide, calcium carbonate, calcium hydroxide, etc. The desulfurized ash has the characteristics of being unstable in components, alkaline, easy to decompose, easy to expand after water absorption, etc., and belongs to a solid waste that is difficult to treat and difficult to recycle. At present, generally, the desulfurized ash can only be treated by means of landfilling, which not only pollutes the environment and occupies the land, but also causes great potential safety hazards.

SUMMARY

In order to solve the technical problem that desulfurized ash is difficult to treat and difficult to realize comprehensive utilization in the prior art, the present invention aims to provide a resource recovery method and a resource recovery system of desulfurized ash.

In order to achieve one of the above objectives, an implementation of this application provides a resource recovery method of desulfurized ash, comprising:
  a water washing process: washing desulfurized ash with water, and performing solid-liquid separation to obtain solid residues rich in calcium sulfite and calcium sulfate and a solution rich in calcium hydroxide;
  a slurry preparation process: preparing the solution rich in calcium hydroxide into desulfurization slurry; and
  a roasting process: roasting the solid residues rich in calcium sulfite and calcium sulfate under the action of a reducing agent to obtain flue gas rich in sulfur dioxide and residues rich in calcium oxide.

As a further improvement of the implementation of this application, in the water washing process, a mass ratio of water to desulfurized ash is greater than 20:1.

As a further improvement of the implementation of this application, in the water washing process, the obtained solid residues are subjected to compression and drying dehydration pretreatment, in which the drying temperature is 200-400° C.

As a further improvement of the implementation of this application, in the roasting process, the reducing agent is a reducing atmosphere.

As a further improvement of the implementation of this application, the reducing atmosphere is an atmosphere in which the volume fraction of carbon monoxide is 0-5% and the volume fraction of oxygen is less than 2%.

As a further improvement of the implementation of this application, the reducing atmosphere is an atmosphere in which the volume fraction of carbon monoxide is 0-2% and the volume fraction of oxygen is less than 2%.

As a further improvement of the implementation of this application, in the roasting process, the roasting temperature is 1000-1300° C.

As a further improvement of the implementation of this application, in the slurry preparation process, the prepared desulfurization slurry is used for flue gas desulfurization; and
  the resource recovery method further comprises an analysis process: after performing the water washing process and the slurry preparation process for several cycles, adding sodium carbonate and/or potassium carbonate to the solution obtained in the next water washing process, performing solid-liquid separation to obtain a salt solution and solid phase precipitates rich in calcium carbonate, and evaporating, concentrating and crystallizing the salt solution.

As a further improvement of the implementation of this application, the resource recovery method further comprises a residue use process: adding the residues obtained in the roasting process to the solution in the slurry preparation process to prepare desulfurization slurry.

As a further improvement of the implementation of this application, the resource recovery method further comprises a residue reuse process: after performing the water washing process, the roasting process, the residue use process and the slurry preparation process for several cycles, using the residues obtained in the next roasting process as a fusing agent for iron ore sintering.

In order to achieve one of the above objectives, an implementation of this application provides a resource recovery method of desulfurized ash, comprising:
  a water washing process: washing desulfurized ash with water, and performing solid-liquid separation to obtain solid residues rich in calcium sulfite and calcium sulfate and a solution rich in calcium hydroxide;
  an analysis process: adding sodium carbonate and/or potassium carbonate to the solution, performing solid-liquid separation to obtain a salt solution and solid phase precipitates rich in calcium carbonate, and evaporating, concentrating and crystallizing the salt solution; and a roasting process: roasting the solid residues rich in calcium sulfite and calcium sulfate under the action of a reducing agent to obtain flue gas rich in sulfur dioxide and residues rich in calcium oxide.

In order to achieve one of the above objectives, an implementation of this application provides a resource recovery system of desulfurized ash, comprising:

a water washing reaction tank provided with a desulfurized ash delivery port and a water inlet;

a solid-liquid separation device adapted to the water washing reaction tank and used for solid-liquid separation of mixed liquid in the water washing reaction tank;

a desulfurization slurry preparation device communicated with a liquid phase outlet of the solid-liquid separation device; and a roasting reactor communicated with a solid phase outlet of the solid-liquid separation device and provided with a reducing atmosphere injection port, a roasting heating device, a temperature controller and a gas-solid separation device. The temperature controller is connected to and controls the roasting heating device, and the gas-solid separation device is used to separate gas phase products and solid phase products in the roasting reactor.

As a further improvement of the implementation of this application, the resource recovery system comprises m+1 resource recovery subsystems connected in stages in sequence, in which m is a positive integer;

the m+1 resource recovery subsystems all comprise the water washing reaction tank, the solid-liquid separation device and the roasting reactor, and are respectively provided with an external desulfurization reactor communicated with the desulfurized ash delivery port of the respective water washing reaction tank correspondingly;

the first m resource recovery subsystems all comprise the desulfurization slurry preparation device, and a desulfurization slurry output port of the respective desulfurization slurry preparation device is respectively communicated with the external desulfurization reactor corresponding to the next resource recovery subsystem;

the $(m+1)^{th}$ resource recovery subsystem comprises an analysis reactor and a crystallization reactor, and the liquid phase outlet of the solid-liquid separation device of the $(m+1)^{th}$ resource recovery subsystem is communicated to the analysis reactor; the analysis reactor is provided with at least one of a potassium carbonate delivery port and a sodium carbonate delivery port, and is provided with a second solid-liquid separation device; and a liquid phase outlet of the second solid-liquid separation device is communicated to the crystallization reactor.

Compared with the prior art, this application has the following beneficial effects: the desulfurized ash is washed with water, and the solid residues obtained after water washing are roasted under the action of a reducing agent, so that almost all sulfur elements in the desulfurized ash can be transferred to the flue gas in the form of sulfur dioxide, so as to realize the resource recovery of the sulfur elements in the desulfurized ash. Furthermore, the solution obtained after water washing and the residues obtained after roasting of the solid residues are taken to together prepare the desulfurization slurry, so that the calcium elements in the desulfurized ash re-enter the desulfurization slurry, so as to realize the recycling of the calcium elements in the desulfurization process, and the whole process does not produce solid waste, liquid waste, gas waste, etc., and thus has significant economic and environmental benefits. In addition, the precipitates decomposed from the solution obtained after water washing under the action of potassium carbonate or sodium carbonate and the solid residues obtained after water washing can also be roasted to obtain calcium oxide residues which are further used for iron ore sintering, so as to realize the recycling of the calcium elements, and the whole process does not produce solid waste, liquid waste, gas waste, etc., and thus has significant economic and environmental benefits.

DETAILED DESCRIPTION

The present invention is described in detail below with reference with the specific implementations shown in the accompanying drawings. However, these implementations do not limit the present invention, and structural, method, or functional transformations made by a person of ordinary skill in the art according to these implementations should fall within the protection scope of the present invention.

First Implementation

Figure 1:
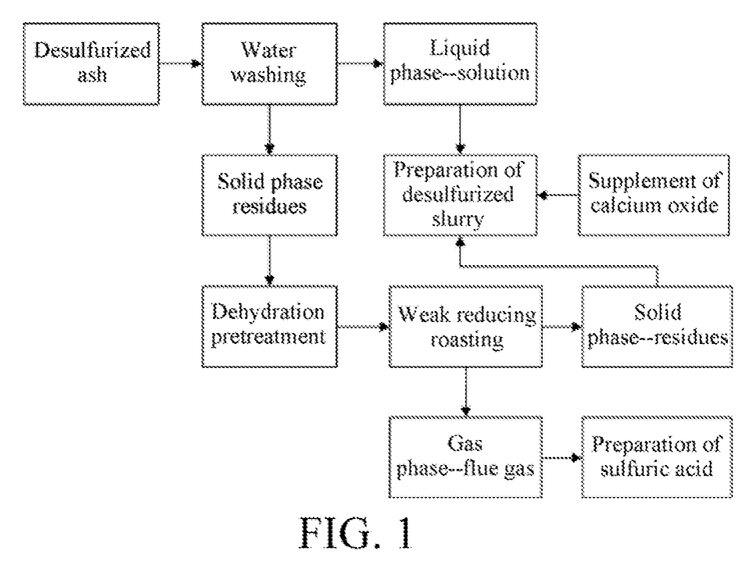
FIG. 1 is a process flowchart of a resource recovery method of desulfurized ash in a first implementation of this application.

Referring to FIG. 1, a first implementation of a resource recovery method of desulfurized ash is provided, which can realize the efficient treatment of the desulfurized ash and realize the recovery of elements such as sulfur and calcium in the desulfurized ash, so that the desulfurized ash can be used as a resource with high added value, and the whole process does not produce solid waste, liquid waste, gas waste, etc., and thus is economic and environment-friendly. Specifically, the resource recovery method comprises the following processes:

Water washing process: desulfurized ash is washed with water, and solid-liquid separation is performed to obtain solid residues rich in calcium sulfite and calcium sulfate and a solution rich in calcium hydroxide.

Main components of the desulfurized ash generally comprise: calcium sulfite, calcium sulfate, calcium oxide, calcium carbonate, calcium hydroxide, etc. The desulfurized ash can be specifically selected from either of dry desulfurized ash and semi-dry desulfurized ash or a mixture of both. The dry desulfurized ash specifically can be any one or any combination of circulating fluidized bed flue gas desulfurized ash or other dry desulfurized ash, and the semi-dry desulfurized ash specifically can be any one or any combination of rotary spray flue gas desulfurized ash or other semi-dry desulfurized ash.

In the water washing process, first, the desulfurized ash is washed with water, calcium hydroxide in the desulfurized ash is dissolved in water, calcium oxide reacts with water to produce calcium hydroxide, and thus, both calcium hydroxide and calcium oxide in the desulfurized ash can enter the liquid phase; however, calcium sulfite, calcium sulfate, calcium carbonate, etc. are insoluble in water; and thus, through solid-liquid separation, the obtained liquid phase is rich in calcium hydroxide, and the obtained solid residues retain calcium sulfite, calcium sulfate, calcium carbonate, etc. in the original desulfurized ash. That is, through the water washing process, the calcium oxide and calcium hydroxide in the desulfurized ash that do not participate in the flue gas desulfurization reaction are separated and are further re-prepared into the desulfurization slurry for recycling as described in the later slurry preparation process.

Preferably, in the water washing process, a mass ratio of water to desulfurized ash is greater than 20:1, thereby ensuring that the water volume is sufficient to extract all the calcium oxide and calcium hydroxide in the desulfurized ash. The water and the desulfurized ash can be fully mixed by means of mechanical stirring, and can also be fully mixed by other existing operations known in the art.

In the water washing process, specifically; the solid-liquid separation can be realized by means of filtration, centrifugation, etc.

Further, after the solid-liquid separation, the obtained solid residues are subjected to dehydration pretreatment. Specifically, any one or two processes such as compression and drying can be used for dehydration pretreatment. Preferably, the solid residues are dried to remove the moisture of the solid residues, and the drying temperature may be 200-400° C. In this way, on the one hand, the moisture of the solid residues can be removed, thereby avoiding the potential safety hazard caused by the fact that the solid residues with larger moisture content are directly put into the subsequent roasting process for high-temperature roasting; and on the other hand, through reasonable temperature control, the solid residues can be properly preheated, so that the process of delivering the solid residues into the subsequent roasting process for high-temperature roasting is smoother, and unexpected reaction changes of the solid residues due to excessive temperature are avoided.

Slurry preparation process: the solution rich in calcium hydroxide obtained in the water washing process is prepared into desulfurization slurry.

Through the water washing process, calcium oxide and calcium hydroxide in the desulfurized ash are separated to obtain a solution rich in calcium hydroxide. In the slurry preparation process, the solution is prepared into the desulfurization slurry. Therefore, by combining the water washing process and the slurry preparation process, the desulfurization slurry can be obtained based on calcium oxide and calcium hydroxide in the desulfurized ash, and the resource recovery of calcium oxide and calcium hydroxide in the desulfurized ash can be realized.

Preferably, in the slurry preparation process, calcium oxide is added to the solution rich in calcium hydroxide to prepare the desulfurization slurry.

Further, the slurry preparation process further comprises: the flue gas rich in sulfur dioxide is desulfurized by the desulfurization slurry. That is, the desulfurization slurry is re-applied to a flue gas desulfurization process to desulfurize the flue gas rich in sulfur dioxide, and especially can be applied to a semi-dry flue gas desulfurization process. Therefore, the combination of the water washing process and the slurry preparation process can not only realize the resource recovery of calcium oxide and calcium hydroxide in the desulfurized ash, but also further realize the resource recycling of the recovered product (that is, the desulfurization slurry) of calcium oxide and calcium hydroxide.

Roasting process: the solid residues rich in calcium sulfite and calcium sulfate obtained in the water washing process are roasted under the action of a reducing agent to obtain flue gas rich in sulfur dioxide and residues rich in calcium oxide.

Through the water washing process, calcium sulfite, calcium sulfate, calcium carbonate, etc. in the desulfurized ash are separated into the solid residues, that is, the main components in the solid residues are calcium sulfite, calcium sulfate, calcium carbonate, etc. In the roasting process, the solid residues are roasted under the action of a reducing agent. Due to the reducing action of the reducing agent and the effect of roasting, calcium sulfate and calcium sulfite in the solid residues are converted into calcium oxide, and sulfur dioxide is released, thereby obtaining the flue gas rich in sulfur dioxide and the residues rich in calcium oxide.

Therefore, by combining the water washing process and the roasting process, the flue gas rich in sulfur dioxide can be obtained based on calcium sulfate and calcium sulfite in the desulfurized ash, so that almost all sulfur elements in the desulfurized ash can be transferred to the flue gas in the form of sulfur dioxide, so as to realize the resource recovery of the sulfur elements in the desulfurized ash. Further preferably, the roasting process also comprises: the obtained flue gas is prepared into sulfuric acid. Specifically, the flue gas can be prepared into different concentrations of sulfuric acid by processes such as dust removal, purification, catalytic oxidation and absorption. Therefore, the combination of the water washing process and the roasting process not only realizes the resource recovery of the sulfur elements in the desulfurized ash, but also further realizes the resource recycling of the recovered product (that is, the flue gas) of the sulfur elements.

Furthermore, in addition to calcium sulfate and calcium sulfite, the main components in the solid residues further comprise calcium carbonate. In the roasting process, by roasting the solid residues at a high temperature, calcium sulfite and calcium sulfate can fully react to produce calcium oxide, and calcium carbonate in the solid residues can also be decomposed into calcium oxide. The reaction is substantially as follows:

$$CaCO_3 = CaO + CO_2.$$

That is, in the roasting process, the flue gas rich in sulfur dioxide and carbon dioxide and the residues rich in calcium oxide can be obtained.

Therefore, by combining the water washing process and the roasting process, almost all calcium elements in calcium sulfate, calcium sulfite and calcium carbonate in the desulfurized ash can be transferred to the residues obtained in the roasting process in the form of calcium oxide, so as to realize the resource recovery of this part of the calcium elements, and the residues can be used in a variety of different industrial production (such as a preferred residue use process as described later), so as to realize the resource recycling of this part of the calcium elements.

Further, in the roasting process, the reducing agent is a reducing atmosphere, that is, in the roasting process, the solid residues are roasted in the reducing atmosphere. In this way, compared with the use of solid phase reducing agents such as coke and pulverized coal, by roasting the solid residues in the reducing atmosphere, the doping of unconsumed solid phase reducing agents in the residues after roasting can be avoided to ensure that the component purity of the residues obtained after roasting is better.

Preferably, the reducing atmosphere is a weak reducing atmosphere, and specifically an atmosphere in which the volume fraction of carbon monoxide is 0-5% and the volume fraction of oxygen is less than 2%, and the remaining gases are usually nitrogen or inert gases. In this way, by preferably selecting carbon monoxide as a reducing gas to react with the solid residues and optimizing the volume fraction of carbon monoxide, calcium sulfite and calcium sulfate in the solid residues can be fully converted into calcium oxide, uncontrollable reaction products caused by excessive carbon monoxide gas can be avoided, and the waste of resources can be avoided.

Specifically, in the roasting process, the reactions involved in calcium sulfite and calcium sulfate are substantially as follows:

In addition, in the reducing atmosphere, the volume fraction of carbon monoxide is further preferably 0-2%. That is, the reducing atmosphere is an atmosphere in which the volume fraction of carbon monoxide is 0-2% and the volume fraction of oxygen is less than 2%.

Further, in the roasting process, the roasting temperature is 1000-1300° C. In this way, it can be ensured that calcium sulfite and calcium sulfate are fully converted into calcium oxide, and the efficiency of the reduction reaction can be ensured. As described above, by performing dehydration pretreatment on the solid residues before roasting, the potential safety hazard caused by direct high-temperature roasting of the solid residues with larger moisture content can be avoided. Furthermore, this implementation facilitates the realization of continuous production operations. Of course, as a changed implementation, in the roasting process, the solid residues can be roasted by slowly raising the temperature to the above roasting temperature. Although this changed embodiment is inconvenient for continuous production operations, the operation of the dehydration pretreatment of the solid residues before roasting can be omitted so as to simplify the process.

In addition, in the roasting process, the obtained flue gas and residues can be subjected to gas-solid separation by means of bag dust removal, centrifugation, etc. Of course, the gas-solid separation can also be realized by other existing operations known in the art.

Residue use process: the residues obtained in the roasting process are added to the solution in the slurry preparation process.

The residues obtained in the roasting process are rich in calcium oxide. The residues are added to the solution in the slurry preparation process, so that calcium oxide in the residues and calcium hydroxide in the solution in the slurry preparation process are together prepared into desulfurization slurry. As a result, the amount of new calcium oxide resources additionally delivered in the slurry preparation process can be reduced, and almost all calcium elements in the desulfurized ash re-enter the desulfurization slurry, so as to realize the resource recycling of the calcium elements in the desulfurized ash. Furthermore, by combining the water washing process, the slurry preparation process, the roasting process and the residue use process, the recycling of calcium resources in the desulfurization process can be realized, and the utilization value and economic benefits can be improved.

Figure 2:
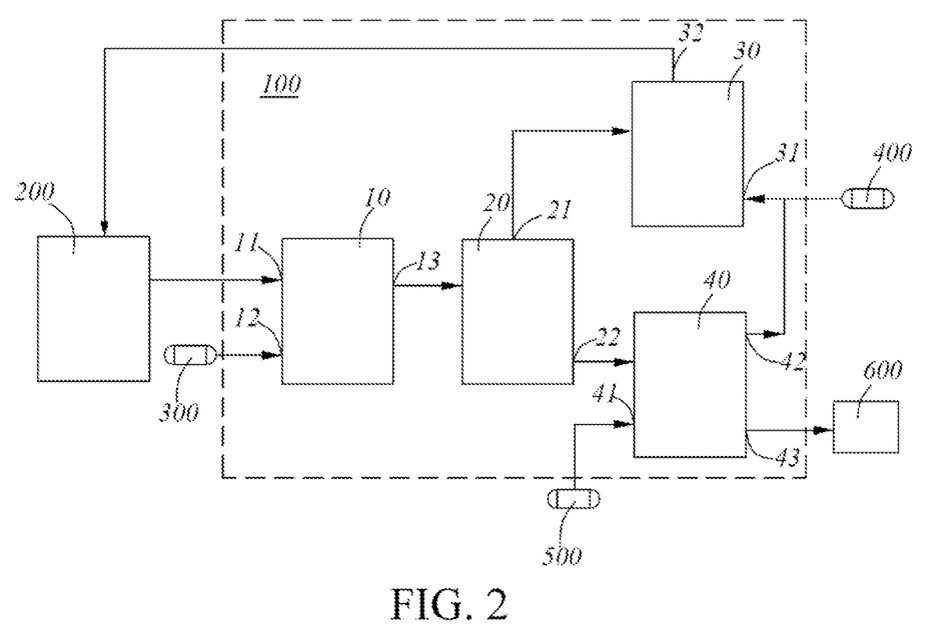
FIG. 2 is a schematic diagram of a resource recovery system of desulfurized ash in the first implementation of this application.

Referring to FIG. 2, a first implementation of a resource recovery system 100 of desulfurized ash is further provided. The resource recovery system can be used to realize the resource recovery method of the first implementation as described above. The structure and function of the resource recovery system 100 can be understood below in conjunction with the foregoing description of the resource recovery method.

Specifically, the resource recovery system 100 comprises a water washing reaction tank 10, a solid-liquid separation device 20, a desulfurization slurry preparation device 30 and a roasting reactor 40.

The water washing reaction tank 10 is provided with a desulfurized ash delivery port 11 and a water inlet 12. As the name implies, the desulfurized ash delivery port 11 can be used to introduce the desulfurized ash into the water washing reaction tank 10, and can be communicated to a desulfurized ash discharge port of an external desulfurization reactor 200. The desulfurization reactor 200 specifically can be any one or a combination of a dry desulfurization reactor and a semi-dry desulfurization reactor. The water inlet 12 can be used to introduce water into the water washing reaction tank 10, and can be communicated to an external water supply reservoir 300. By arranging the water washing reaction tank 10, the desulfurized ash and water can be gathered in the water washing reaction tank 10 to form mixed liquid, so as to realize the water washing operation of the desulfurized ash in the water washing process as described above, so that both calcium hydroxide and calcium oxide in the desulfurized ash can enter the liquid phase, and calcium sulfite, calcium sulfate, calcium carbonate, etc. are insoluble in water and remain in a solid phase state or suspend in the mixed liquid.

Preferably, the water washing reaction tank 10 is further provided with a stirring device, and the stirring device can fully stir the desulfurized ash and water in the water washing reaction tank 10, so that calcium oxide and calcium hydroxide in the desulfurized ash can fully enter the liquid phase.

The solid-liquid separation device 20 is adapted to the water washing reaction tank 10 and is used for solid-liquid separation of the mixed liquid in the water washing reaction tank 10. The solid-liquid separation device 20 can be arranged inside the water washing reaction tank 10, or arranged outside the water washing reaction tank 10, or integrated with the water washing reaction tank 10, and can be specifically set as any one or any combination of a settler, a filter device, a centrifuge, etc. Of course, the solid-liquid separation device 20 can also be implemented with other existing structures or devices known in the art that can realize solid-liquid separation. In the example of the drawings, the solid-liquid separation device 20 is a filter tower arranged outside the water washing reaction tank 10, the mixed liquid in the water washing reaction tank 10 can be delivered into the filter tower through a discharge port 13 of the water washing reaction tank 10, and the mixed liquid can be subjected to solid-liquid separation in the filter tower.

Therefore, by combining the water washing reaction tank 10 and the solid-liquid separation device 20, the water washing process as described above can be realized. The liquid phase obtained by separation from the solid-liquid separation device 20 is a solution rich in calcium hydroxide, and the solid phase obtained by separation is solid residues rich in calcium sulfite, calcium sulfate and calcium carbonate.

The desulfurization slurry preparation device 30 can be used to realize the slurry preparation process as described above, and specifically is communicated with a liquid phase outlet 21 of the solid-liquid separation device 20, so that the liquid phase separated from the solid-liquid separation device 20 is delivered into the desulfurization slurry preparation device 30. That is, the desulfurization slurry preparation device 30 can introduce the solution rich in calcium hydroxide from the solid-liquid separation device 20, and further prepare the solution into desulfurization slurry.

Preferably, the desulfurization slurry preparation device 30 is further provided with a calcium oxide delivery port 31. The calcium oxide delivery port 31 can be used to introduce calcium oxide into the desulfurization slurry preparation device 30. Here, the calcium oxide can be derived from an external calcium oxide storage bin 400, or preferably from a solid phase outlet 42 of a gas-solid separation device of the roasting reactor 40 as described later.

Further, a desulfurization slurry output port 32 of the desulfurization slurry preparation device 30 is communicated to an external desulfurization reactor 200. The desulfurization reactor 200 may be a dry desulfurization reactor and/or a semi-dry desulfurization reactor, so that the prepared desulfurization slurry is applied to the flue gas desulfurization process. For example, the desulfurization slurry can be applied to the removal of sulfur dioxide in flue gas through a desulfurization slurry injection system.

The roasting reactor 40 can be used to realize the roasting process as described above, and specifically is communicated with a solid phase outlet 22 of the solid-liquid separation device 20, so that the solid phase separated from the solid-liquid separation device 20 is delivered into the roasting reactor 40. That is, the roasting reactor 40 can introduce the solid residues rich in calcium sulfite, calcium sulfate and calcium carbonate from the solid-liquid separation device 20.

The roasting reactor 40 is provided with a reducing atmosphere injection port 41, a roasting heating device, a temperature controller and a gas-solid separation device.

The reducing atmosphere injection port 41 can be used to inject an atmosphere required for the reaction into the roasting reactor 40, so that a corresponding reaction atmosphere is maintained in the roasting reactor 40. The reducing atmosphere injection port 41 can be communicated to an external gas storage tank 500. Preferably, the reducing atmosphere is a weak reducing atmosphere, and specifically an atmosphere in which the volume fraction of carbon monoxide is 0-5% and the volume fraction of oxygen is less than 2%, and the remaining gases are usually nitrogen or inert gases. The volume fraction of carbon monoxide may further preferably be 0-2%. In this way, by arranging the reducing atmosphere injection port 41, the reaction atmosphere in the roasting reactor 40 can be maintained conveniently to ensure that the roasting reaction of the roasting reactor 40 proceeds smoothly.

The temperature controller is connected to and controls the roasting heating device to work to generate heat, so as to maintain a required roasting temperature in the roasting reactor 40. Preferably, under the control of the temperature controller, the roasting heating device works to generate heat, so as to maintain a roasting temperature of 1000-1300° C. in the roasting reactor 40.

In this way, by arranging the roasting reactor 40, the roasting process as described above can be realized, that is, high-temperature roasting of the solid residues rich in calcium sulfite, calcium sulfate and calcium carbonate can be realized, so that calcium sulfite and calcium sulfate are converted into calcium oxide and sulfur dioxide, calcium carbonate is decomposed into calcium oxide and carbon dioxide, and finally, the flue gas rich in sulfur dioxide and carbon dioxide and the residues rich in calcium oxide are obtained.

The gas-solid separation device is used to separate gas phase products and solid phase products in the roasting reactor 40. That is, the flue gas rich in sulfur dioxide and carbon dioxide and the residues rich in calcium oxide can be separated, so that the flue gas and the residues can be further used as resources. Preferably, the gas-solid separation device may be a bag dust removal device or a centrifugal device arranged in the roasting reactor 40.

Preferably, a gas phase outlet 43 of the gas-solid separation device can be communicated with a sulfuric acid preparation device 600, so that the flue gas obtained in the roasting reactor 40 is used to prepare sulfuric acid; and the solid phase outlet 42 of the gas-solid separation device can be communicated to the calcium oxide delivery port 31 of the desulfurization slurry preparation device 30, so that the residues rich in calcium oxide and the solution rich in calcium hydroxide separated from the solid-liquid separation device 20 are mixed for preparing the desulfurization slurry. In this way, the amount of calcium oxide additionally delivered from the external calcium oxide storage bin 400 can be reduced.

In addition, preferably, a dehydration device can also be arranged between the roasting reactor 40 and the solid phase outlet 22 of the solid-liquid separation device 20. The solid residues separated from the solid-liquid separation device 20 first enter the dehydration device for dehydration pretreatment before being delivered into the roasting reactor 40, so as to at least partially remove the moisture in the solid residues, thereby avoiding the potential safety hazard caused by the fact that the solid residues with larger moisture content are directly delivered into the roasting reactor 40 at a high temperature.

Further, the dehydration device may comprise any one or a combination of a compression dehydration apparatus and a drying apparatus. Preferably, the dehydration device comprises a compression dehydration apparatus and a drying apparatus, the compression dehydration apparatus is arranged relatively close to the solid phase outlet 22 of the solid-liquid separation device 20, the drying apparatus is arranged between the compression dehydration apparatus and the roasting reactor 40, and the solid residues sequentially enter the compression dehydration apparatus and the drying apparatus for dehydration pretreatment.

In conclusion, compared with the prior art, the resource recovery method and the resource recovery system 100 in an implementation of this application have the following beneficial effects: the desulfurized ash is washed with water, and the solid residues obtained after water washing are roasted under the action of a reducing agent, so that almost all sulfur elements in the desulfurized ash can be transferred to the flue gas in the form of sulfur dioxide, so as to realize the resource recovery of the sulfur elements in the desulfurized ash. Furthermore, the solution obtained after water washing and the residues obtained after roasting of the solid residues are taken to together prepare the desulfurization slurry, so that the calcium elements in the desulfurized ash re-enter the desulfurization slurry, so as to realize the recycling of the calcium elements in the desulfurization process, and the whole process does not produce solid waste, liquid waste, gas waste, etc., and thus has significant economic and environmental benefits.

A specific embodiment is introduced below to assist in understanding the specific technologies and beneficial effects of the resource recovery method and the resource recovery system in an implementation corresponding to FIG. 1 and FIG. 2.

Embodiment 1

The desulfurized ash produced by a semi-dry desulfurization process in the semi-dry desulfurization reactor 200 was taken and delivered into the water washing reaction tank 10 for water washing, a mass ratio of water to desulfurized ash in the water washing reaction tank 10 was greater than 20:1. Furthermore, under the stirring action of the stirring device of the water washing reaction tank 10, the desulfurized ash and water were fully mixed uniformly to obtain mixed liquid.

The mixed liquid in the water washing reaction tank 10 was delivered to the solid-liquid separation device 20 for solid-liquid separation, the liquid phase obtained by separation was a solution rich in calcium hydroxide, and the solid phase obtained by separation was solid residues rich in calcium sulfate, calcium sulfite and calcium carbonate.

The solid residues rich in calcium sulfate, calcium sulfite and calcium carbonate first enter the compression dehydration apparatus for compression dehydration pretreatment, and then enter the drying apparatus for drying dehydration pretreatment, wherein the temperature in the drying apparatus was controlled to be maintained at 200-400° C.

The dried solid residues were delivered to the roasting reactor 40, at this time, a roasting temperature of 1000-1300° C. was maintained in the roasting reactor 40, and a weak reducing atmosphere in which the volume fraction of carbon monoxide was 0%-5% and the volume fraction of oxygen was less than 2% was maintained in the roasting reactor 40, so that the solid residues were roasted at a high temperature in the weak reducing atmosphere.

The product in the roasting reactor 40 was subjected to gas-solid separation to respectively obtain the flue gas rich in sulfur dioxide and carbon dioxide and the residues rich in calcium oxide.

The flue gas was delivered to the sulfuric acid preparation device 600, so that the flue gas was prepared into different concentrations of sulfuric acid through the processes such as dust removal, purification, catalytic oxidation and absorption. After inspection, the quality of the obtained sulfuric acid met the industry performance standards.

The residues and the solution rich in sodium hydroxide were respectively delivered to the desulfurization slurry preparation device 30, and a small amount of calcium oxide was supplemented into the desulfurization slurry preparation device 30 from the calcium oxide storage bin 400, so as to together prepare the desulfurization slurry. The desulfurization slurry prepared in the desulfurization slurry preparation device 30 was injected into the semi-dry desulfurization reactor 200 through the desulfurization slurry injection system, so that sulfur dioxide in the flue gas was removed by the desulfurization slurry. After inspection, the desulfurization slurry met the industry performance standards, and the desulfurization effect reached the standard.

Second Implementation

Figure 3:
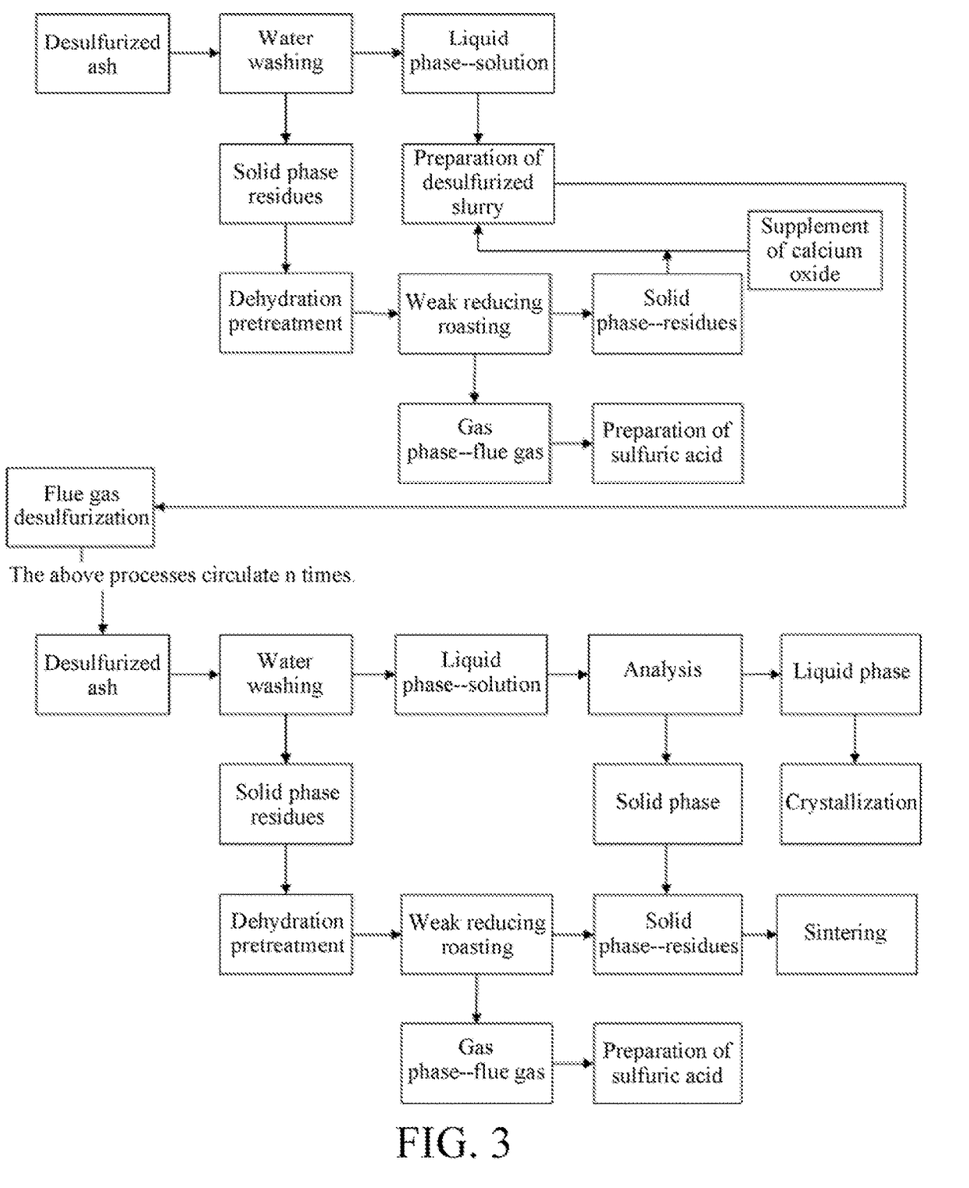
FIG. 3 is a process flowchart of a resource recovery method of desulfurized ash in a second implementation of this application.

Referring to FIG. 3, a second implementation of a resource recovery method of desulfurized ash is provided, which also can realize the efficient treatment of the desulfurized ash and realize the recovery of elements such as sulfur and calcium in the desulfurized ash, so that the desulfurized ash can be used as a resource with high added value, and the whole process does not produce solid waste, liquid waste, gas waste, etc., and thus is economic and environment-friendly.

The resource recovery method of this implementation also comprises a water washing process, a slurry preparation process, a roasting process and a residue use process, and each process is the same as that in the first implementation in FIG. 1 and will not be repeated. Different from the first implementation, this implementation also takes further countermeasures for the situation after the water washing process and the slurry preparation process are performed for several cycles and the situation after the water washing process, the roasting process and the residue use process are performed for several cycles.

Specifically, in this implementation, the resource recovery method further comprises the following processes.

Analysis process: after the water washing process and the slurry preparation process are performed for several cycles, sodium carbonate and/or potassium carbonate is added to the solution obtained in the next water washing process, solid-liquid separation is performed to obtain a salt solution and solid phase precipitates rich in calcium carbonate, and the salt solution is evaporated, concentrated and crystallized.

Several cycles are performed, and each of the cycles comprises the water washing process and the slurry preparation process. Preferably, the desulfurized ash in the water washing process of each cycle is taken from the desulfurized ash produced after the desulfurization slurry obtained in the slurry preparation process of the previous cycle is used for flue gas desulfurization. In other words, the desulfurized ash produced after the desulfurization slurry obtained in the slurry preparation process of each cycle is used for flue gas desulfurization is put into the water washing process of the next cycle.

When the water washing process and the slurry preparation process are performed for a cycle, potassium chloride, sodium chloride, calcium chloride, etc. will be introduced into the desulfurized ash. After the water washing process and the slurry preparation process are performed for several cycles, a large amount of potassium chloride, sodium chloride and calcium chloride is enriched finally. In the analysis process, after several cycles are performed, for the solution obtained in the next water washing process, the slurry preparation process is not performed, but sodium carbonate and/or potassium carbonate is added to the solution. Thus, in the solution, carbonate ions (from added sodium carbonate and/or potassium carbonate) and calcium ions (from calcium hydroxide and enriched calcium chloride) react to produce calcium carbonate insoluble in water, and simultaneously produce free potassium chloride and/or sodium chloride. Taking adding potassium carbonate as an example, specific reactions are substantially as follows:

$$K_2CO_3+CaCl_2=2KCl+CaCO_3,$$

$$K_2CO_3+Ca(OH)_2=2KOH+CaCO_3.$$

Then, solid-liquid separation is performed by any means of filtration, centrifugation, etc. to obtain a salt solution rich in potassium chloride and sodium chloride and solid phase precipitates rich in calcium carbonate.

The solid phase precipitates rich in calcium carbonate can be used in a variety of different industrial production. Preferably, the solid phase precipitates can be put into the roasting process, calcium carbonate in the solid phase precipitates can be decomposed into calcium oxide and carbon dioxide by roasting, and further, gas-solid separation is performed to obtain calcium oxide to be used as a desulfurization agent for flue gas desulfurization or as a fusing agent for iron and steel sintering.

The salt solution is evaporated, concentrated and crystallized, therefore, potassium chloride crystals and/or sodium chloride crystals can be precipitated from the salt solution.

In this way, by providing the analysis process, potassium chloride and sodium chloride crystals can be extracted from the desulfurized ash enriched with calcium chloride, potassium chloride and sodium chloride produced due to multiple cycles, and calcium elements are recovered and even recycled as resources in the form of calcium carbonate, thereby obtaining economic and environmental benefits with high added value.

"Several" in "several cycles" in the analysis process can be set to any positive integer according to actual production needs or according to the enriching situation of hydrochloride in the desulfurized ash, and can be represented by m.

In addition, as a changed implementation, if the resource recovery method is only implemented in the $(m+1)^{th}$ cycle, the method comprises: the water washing process; sodium carbonate and/or potassium carbonate is added to the solution obtained in the water washing process, solid-liquid separation is performed to obtain a salt solution and solid phase precipitates rich in calcium carbonate, the salt solution is evaporated, concentrated and crystallized, and the solid phase precipitates rich in calcium carbonate are put into the subsequent roasting process; and the roasting process.

Residue reuse process: after the water washing process, the roasting process, the residue use process and the slurry preparation process are performed for several cycles, the residues obtained in the next roasting process are put into a sintering machine to be used as a fusing agent for iron ore sintering.

As described above, several cycles are performed, and each of the cycles comprises the water washing process, the roasting process, the residue use process and the slurry preparation process. In the residue use process of each cycle, the residues obtained in the roasting process of this cycle are added to the slurry preparation process of this cycle, and the desulfurized ash produced after the prepared desulfurization slurry is used for flue gas desulfurization is put into the water washing process of the next cycle.

When a cycle is performed, new iron elements may be introduced into the desulfurized ash. After several cycles are performed, a large number of iron elements will be enriched with the desulfurized ash finally, and the iron elements will enter the residues obtained in the roasting process. As a result, in the residue reuse process, after several cycles are performed, the residues obtained in the next roasting process are no longer used to prepare the desulfurization slurry as in the residue use process, but are put into the sintering machine to be used as raw materials for iron ore sintering, so that the enriched iron elements can be recovered and used with high added value.

"Several" in "several cycles" in the residue reuse process can be set to any positive integer according to actual production needs or according to the enriching situation of the iron elements in the desulfurized ash, and may be the same as or different from the "several" in the analysis process as described above.

In addition, in a changed implementation, if the resource recovery method is only implemented in the $(m+1)^{th}$ cycle, the method substantially comprises: the water washing process; the roasting process; and the residues obtained in the roasting process are put into the sintering machine to be used as raw materials for iron ore sintering.

Figure 4:
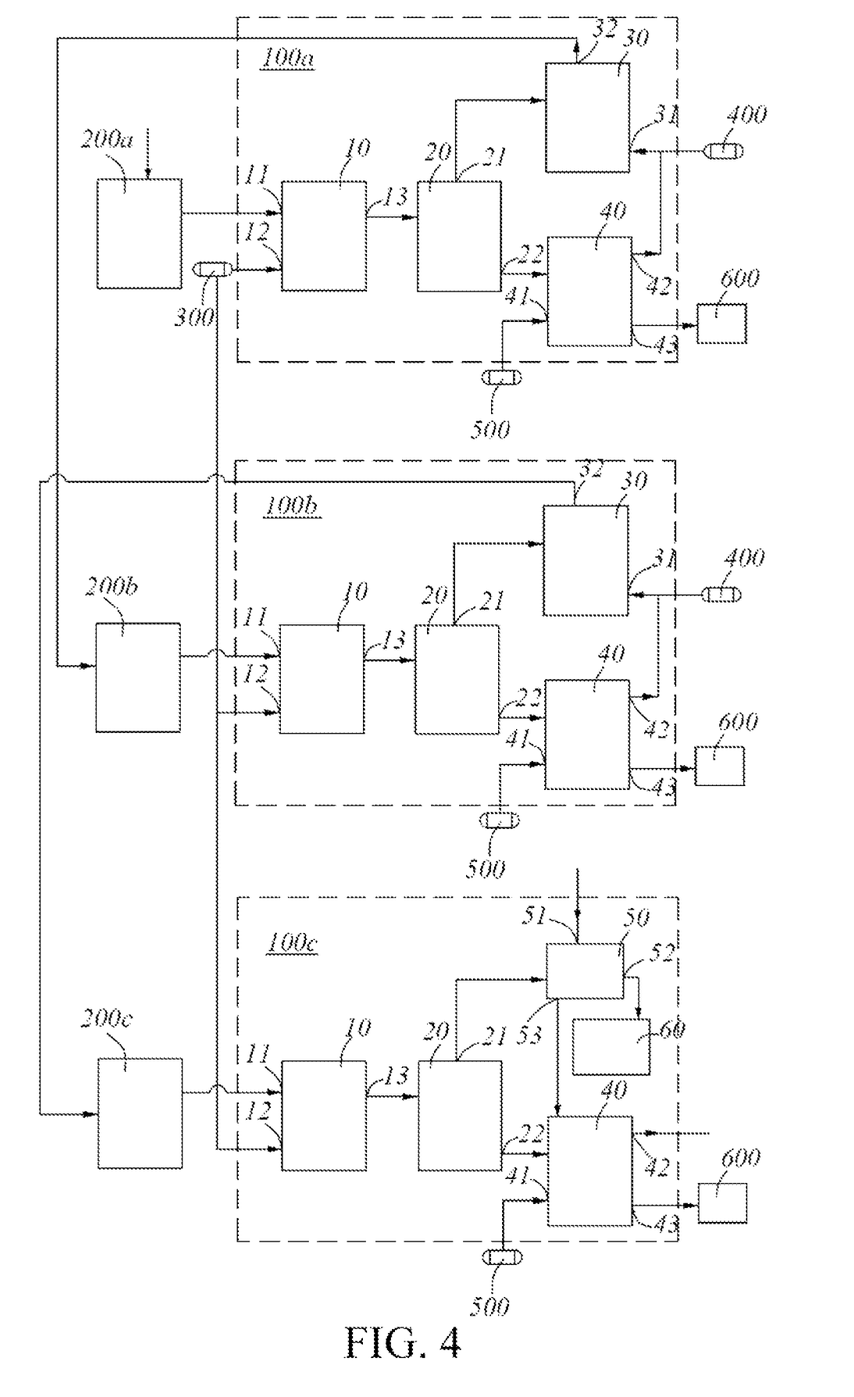
FIG. 4 is a schematic diagram of a resource recovery system of desulfurized ash in the second implementation of this application.

FIG. 4 further provides a second implementation of a resource recovery system 100 of desulfurized ash. The resource recovery system 100 can be used to realize the resource recovery method of the second implementation as described above. The structure and function of the resource recovery system 100 can be understood below in conjunction with the foregoing description of the resource recovery method of the second implementation. In addition, the resource recovery system 100 of this implementation is slightly different from the resource recovery system 100 of the first implementation illustrated in FIG. 2, and the following will focus on the different points. This implementation can be understood in conjunction with the foregoing description of the resource recovery system 100 of the first implementation.

The resource recovery system 100 of this implementation comprises m+1 resource recovery subsystems connected in stages, in which m is a positive integer, and in the example of the drawings, m=2. That is, the resource recovery system 100 comprises a resource recovery subsystem 100a, a resource recovery subsystem 100b and a resource recovery subsystem 100c, and the resource recovery subsystem 100a, the resource recovery subsystem 100b and the resource recovery subsystem 100c are arranged in stages in sequence.

Each of the resource recovery subsystems comprises a water washing reaction tank 10, and is correspondingly provided with an external desulfurization reactor communicated with a desulfurized ash delivery port 11 of the water washing reaction tank 10. For example, the resource recovery subsystem 100a is corresponding to an external desulfurization reactor 200a, and the desulfurized ash delivery port 11 of the water washing reaction tank 10 of the resource recovery subsystem 100a is communicated to the desulfurized ash discharge port of the external desulfurization reactor 200a, so as to introduce desulfurized ash from the external desulfurization reactor 200a; the resource recovery subsystem 100b is corresponding to an external desulfurization reactor 200b, and the desulfurized ash delivery port 11 of the water washing reaction tank 10 of the resource recovery subsystem 100b is communicated to the desulfurized ash discharge port of the external desulfurization reactor 200b, so as to introduce desulfurized ash from the external desulfurization reactor 200b; and the resource recovery subsystem 100c is corresponding to an external desulfurization reactor 200c, and the desulfurized ash delivery port 11 of the water washing reaction tank 10 of the resource recovery subsystem 100c is communicated to the desulfurized ash discharge port of the external desulfurization reactor 200c, so as to introduce desulfurized ash from the external desulfurization reactor 200c.

In this implementation, the water washing reaction tank 10 of each of the resource recovery subsystems is set to be the same as the water washing reaction tank 10 of the resource recovery system 100 of the first implementation as described above, and is identified with the same reference number and will not be repeated.

In this implementation, each of the resource recovery subsystems comprises a solid-liquid separation device 20. Except for the point that the liquid phase outlet 21 of the solid-liquid separation device 20 of the $(m+1)^{th}$ resource recovery subsystem mentioned later is not communicated with the desulfurization slurry preparation device but communicated with an analysis reactor 50, the solid-liquid separation device 20 is set to be the same as the solid-liquid separation device 20 of the resource recovery system 100 of the first implementation as described above, and is identified with the same reference number, and the rest will not be repeated except for the difference.

In this implementation, the first m resource recovery subsystems all comprise a desulfurization slurry preparation device 30. For example, as shown in figures, the resource recovery subsystem 100a and the resource recovery subsystem 100b both comprise a desulfurization slurry preparation device 30. Regarding the desulfurization slurry preparation device 30, the difference between the resource recovery system of this implementation and the resource recovery system 100 illustrated in FIG. 2 is only: in the resource recovery system 100 illustrated in FIG. 2, the desulfurization slurry output port 32 of the desulfurization slurry preparation device 30 is communicated to the external desulfurization reactor 200, and the desulfurized ash produced after the prepared desulfurization slurry is used for flue gas desulfurization is put into the water washing reaction tank 10 so as to be treated. In the resource recovery system 100 of this implementation, the desulfurization slurry output ports 32 of the respective desulfurization slurry preparation devices 30 of the first m resource recovery subsystems are respectively communicated with the external desulfurization reactor corresponding to the resource recovery subsystem of the next stage, so that the desulfurized ash produced after the desulfurization slurry prepared by the desulfurization slurry preparation device 30 is used for flue gas desulfurization is put into the water washing reaction tank 10 of the next stage so as to be treated.

For example, the desulfurization slurry preparation device 30 of the resource recovery subsystem 100a is communicated with the external desulfurization reactor 200b corresponding to the resource recovery subsystem 100b of the next stage, so that the desulfurized ash produced after the desulfurization slurry prepared by the desulfurization slurry preparation device 30 is used for flue gas desulfurization is put into the water washing reaction tank 10 of the resource recovery subsystem 100b of the next stage so as to be treated. In sequence, the desulfurization slurry preparation device 30 of the resource recovery subsystem 100b is communicated with the external desulfurization reactor 200c corresponding to the resource recovery subsystem 100c of the next stage.

Except for the above point, the respective desulfurization slurry preparation devices 30 of the first m resource recovery subsystems are set to be the same as the desulfurization slurry preparation device 30 of the resource recovery system 100 of the first implementation as described above, and are identified with the same reference number and will not be repeated. In this implementation, different from the first m resource recovery subsystems, the liquid phase outlet 21 of the solid-liquid separation device 20 of the (m+1)$^{th}$ resource recovery subsystem is not connected with the desulfurization slurry preparation device. Specifically, the (m+1)$^{th}$ resource recovery subsystem takes the illustrated resource recovery subsystem 100c as an example, the resource recovery subsystem 100c comprises an analysis reactor 50 and a crystallizer 60, and the analysis reactor 50 and the crystallizer 60 are used to realize the analysis process as described above.

The analysis reactor 50 is communicated to the liquid phase outlet 21 of the solid-liquid separation device 20 of the resource recovery subsystem 100c, so that the liquid phase separated from the solid-liquid separation device 20 is delivered into the analysis reactor 50.

The analysis reactor 50 is provided with a potassium carbonate delivery port 51 and a second solid-liquid separation device.

The potassium carbonate delivery port 51 can be used to introduce potassium carbonate into the analysis reactor 50, in which the potassium carbonate can be derived from an external potassium carbonate storage bin. Of course, in a changed implementation, the potassium carbonate delivery port 51 can be replaced by a sodium carbonate delivery port or can be integrated with the sodium carbonate delivery port. With reference to the foregoing description of the analysis process of the second implementation, after the resource recovery subsystem 100a and the resource recovery subsystem 100b, the solution rich in calcium hydroxide separated from the solid-liquid separation device 20 of the resource recovery subsystem 100c is enriched with potassium chloride, sodium chloride and calcium chloride, and by arranging the analysis reactor 50, sodium carbonate and/or potassium carbonate is added to the solution. Thus, in the solution, carbonate ions (from added sodium carbonate and/or potassium carbonate) and calcium ions (from calcium hydroxide and enriched calcium chloride) react to produce calcium carbonate insoluble in water, and simultaneously produce free potassium chloride and/or sodium chloride.

Preferably, the analysis reactor 50 is further provided with a second stirring device, and the second stirring device can fully stir the solution rich in calcium hydroxide and the delivered sodium carbonate and/or potassium carbonate in the analysis reactor 50, so that carbonate ions and calcium ions fully contact and react.

The second solid-liquid separation device is used to separate liquid phase products and solid phase products in the analysis reactor 50. That is, the salt solution rich in potassium chloride and sodium chloride and the solid phase precipitates rich in calcium carbonate can be separated, so that the salt solution and the solid phase precipitates can be further recovered as resources. Preferably, the second solid-liquid separation device can be arranged inside the analysis reactor 50, or arranged outside the analysis reactor 50, or integrated with the analysis reactor 50, and can be specifically set as any one or any combination of a settler, a filter device, a centrifuge, etc. Of course, the second solid-liquid separation device can also be implemented with other existing structures or devices known in the art that can realize solid-liquid separation.

A liquid phase outlet 52 of the second solid-liquid separation device is communicated with the crystallizer 60, so as to deliver the salt solution rich in potassium chloride and sodium chloride separated from the second solid-liquid separation device to the crystallizer 60. The crystallizer 60 can evaporate, concentrate and crystallize the salt solution, therefore, potassium chloride crystals and/or sodium chloride crystals can be precipitated from the salt solution.

A solid phase outlet 53 of the second solid-liquid separation device is used to deliver the solid phase precipitates rich in calcium carbonate separated from the second solid-liquid separation device out of the analysis reactor 50. The solid phase precipitates rich in calcium carbonate can be used in a variety of different industrial production. Preferably, in the implementation of FIG. 4, the solid phase outlet 53 of the second solid-liquid separation device is communicated to the roasting reactor 40, so as to put the solid phase precipitates into the roasting process, the solid phase precipitates and the solid residues rich in calcium sulfate, calcium sulfite and calcium carbonate delivered from the solid-liquid separation device 20 to the roasting reactor 40 are together roasted at a high temperature, calcium carbonate in the solid phase precipitates is decomposed into calcium oxide and carbon dioxide, and gas-solid separation is further performed to obtain calcium oxide for industrial production (for example, as a desulfurization agent for flue gas desulfurization or as a fusing agent for iron and steel sintering as mentioned later in this implementation).

In this way, by providing the analysis reactor 50 and the crystallizer 60, potassium chloride and sodium chloride crystals can be extracted from the desulfurized ash enriched with calcium chloride, potassium chloride and sodium chloride produced due to multiple cycles, and calcium elements are recovered and even recycled as resources in the form of calcium carbonate, thereby obtaining economic and environmental benefits with high added value.

Further, in this implementation, each of the resource recovery subsystems comprises a roasting reactor 40. Except for the point that the solid phase outlet 42 of the gas-solid separation device of the roasting reactor 40 of the $(m+1)^{th}$ resource recovery subsystem mentioned later is not communicated with the desulfurization slurry preparation device, the roasting reactor 40 is set to be the same as the roasting reactor 40 of the resource recovery system 100 of the first implementation as described above, and is identified with the same reference number. Only this difference will be described below, and the rest will not be repeated.

Specifically, the solid phase outlets 42 of the gas-solid separation devices of the roasting reactors 40 of the first m resource recovery subsystems are all communicated to the calcium oxide delivery port 31 of the desulfurization slurry preparation device 30, so that the residues rich in calcium oxide obtained in the roasting reactor 40 are used to prepare the desulfurization slurry. The solid phase outlet 42 of the gas-solid separation device of the roasting reactor 40 of the $(m+1)^{th}$ resource recovery subsystem is not communicated with the desulfurization slurry preparation device. The $(m+1)^{th}$ resource recovery subsystem takes the illustrated resource recovery subsystem 100c as an example, the solid phase outlet 42 of the gas-solid separation device of the roasting reactor 40 of the resource recovery subsystem 100c is communicated to a fusing agent injection port of an iron ore sintering machine, so that the residues rich in calcium oxide are used as a fusing agent for iron ore sintering. Thus, for the desulfurized ash enriched with iron elements produced due to m cycles, the residues obtained in the roasting reactor 40 of the $(m+1)^{th}$ resource recovery subsystem are rich in calcium oxide and enriched iron elements, and are no longer used to prepare the desulfurization slurry as in the residue use process, but are put into the sintering machine to be used as raw materials for iron ore sintering, so that the enriched iron elements can be recovered and used with high added value.

In conclusion, compared with the prior art, the resource recovery method and the resource recovery system 100 in this implementation have the following beneficial effects: first, through multiple cycles, sulfur and calcium elements in the desulfurized ash are respectively recovered as resources, and the calcium elements are recycled in the desulfurization process; and then, when potassium, sodium and iron elements are enriched in the desulfurized ash, the potassium and sodium elements can be extracted in the form of crystals to obtain recovered products with high added value, and the iron elements are used for iron ore sintering, so that the enriched iron elements can be recovered and used with high added value. The whole process does not produce solid waste, liquid waste, gas waste, etc., and thus has significant economic and environmental benefits.

A specific embodiment is introduced below to assist in understanding the specific technologies and beneficial effects of the resource recovery method and the resource recovery system 100 in a second implementation corresponding to FIG. 3 and FIG. 4.

Embodiment 2

The desulfurized ash produced by the semi-dry desulfurization process in the semi-dry desulfurization reactor 200a was taken and delivered into the resource recovery subsystem 100a; the desulfurized ash was washed with water in the water washing reaction tank 10. The mass ratio of water to desulfurized ash in the water washing reaction tank 10 was greater than 20:1, and the desulfurized ash and water were fully stirred and mixed to obtain mixed liquid; the mixed liquid was delivered to the solid-liquid separation device 20 for solid-liquid separation; the solid residues separated from the solid-liquid separation device 20 were successively subjected to compression dehydration and drying dehydration at a temperature of 200-400° C. and then delivered to the roasting reactor 40 for high-temperature roasting at a roasting temperature of 1000-1300° C. in a weak reducing atmosphere (the volume fraction of carbon monoxide was 0%-5% and the volume fraction of oxygen was less than 2%); the gas phase products after roasting were delivered to the sulfuric acid preparation device 600 and prepared into different concentrations of sulfuric acid through the processes such as dust removal, purification, catalytic oxidation and absorption; after inspection, the quality of the obtained sulfuric acid met the industry performance standards; the solid phase products after roasting and the liquid phase products separated from the solid-liquid separation device 20 were respectively delivered to the desulfurization slurry preparation device 30 to prepare the desulfurization slurry; the desulfurization slurry was injected into the semi-dry desulfurization reactor 200b through the desulfurization slurry injection system, so that sulfur dioxide in the flue gas was removed by the desulfurization slurry; and after inspection, the desulfurization slurry met the industry performance standards, and the desulfurization effect reached the standard.

The desulfurized ash produced by the semi-dry desulfurization process in the semi-dry desulfurization reactor 200b was taken and delivered into the resource recovery subsystem 100b; the desulfurized ash was washed with water in the water washing reaction tank 10. The mass ratio of water to desulfurized ash in the water washing reaction tank 10 was greater than 20:1, and the desulfurized ash and water were fully stirred and mixed to obtain mixed liquid; the mixed liquid was delivered to t e solid-liquid separation device 20 for solid-liquid separation; the solid residues separated from the solid-liquid separation device 20 were successively subjected to compression dehydration and drying dehydration at a temperature of 200-400° C. and then delivered to the roasting reactor 40 for high-temperature roasting at a roasting temperature of 1000-1300° C. in a weak reducing atmosphere (the volume fraction of carbon monoxide was 0%-5% and the volume fraction of oxygen was less than 2%); the gas phase products after roasting were delivered to the sulfuric acid preparation device 600 and prepared into different concentrations of sulfuric acid through the processes such as dust removal, purification, catalytic oxidation and absorption; after inspection, the quality of the obtained sulfuric acid met the industry performance standards; the solid phase products after roasting and the liquid phase products separated from the solid-liquid separation device 20 were respectively delivered to the desulfurization slurry preparation device 30 to prepare the desulfurization slurry; the desulfurization slurry is injected into the semi-dry desulfurization reactor 200c through the desulfurization slurry injection system, so that sulfur dioxide in the flue gas is removed by the desulfurization slurry; and after inspection, the desulfurization slurry met the industry performance standards, and the desulfurization effect reached the standard.

The desulfurized ash produced by the semi-dry desulfurization process in the semi-dry desulfurization reactor 200c was taken and delivered into the resource recovery subsystem 100c; the desulfurized ash was washed with water in the water washing reaction tank 10, wherein a mass ratio of water to desulfurized ash in the water washing reaction tank 10 was greater than 20:1, and the desulfurized ash and water were fully stirred and mixed to obtain mixed liquid; the mixed liquid was delivered to the solid-liquid separation device 20 for solid-liquid separation; the solid residues separated from the solid-liquid separation device 20 were successively subjected to compression dehydration and drying dehydration at a temperature of 200-400° C., and then delivered to the roasting reactor 40 for high-temperature roasting at a roasting temperature of 1000-1300° C. in a weak reducing atmosphere (the volume fraction of carbon monoxide was 0%-5% and the volume fraction of oxygen was less than 2%); the gas phase products after roasting were delivered to the sulfuric acid preparation device 600 and prepared into different concentrations of sulfuric acid through the processes such as dust removal, purification, catalytic oxidation and absorption; after inspection, the quality of the obtained sulfuric acid met the industry performance standards; the solid phase products (the content of iron elements exceed 10%) after roasting were put into the iron ore sintering machine as raw materials; after inspection, the sintering operation was good, and the quality of the sintered products was good; the liquid phase products separated from the solid-liquid separation device 20 were delivered into the analysis reactor 50, potassium carbonate was added to the analysis reactor 50, and solid-liquid separation was performed to obtain solid phase precipitates and liquid phase products; the solid phase precipitates in the analysis reactor 50 were delivered into the roasting reactor 40; and the liquid phase products in the analysis reactor 50 were delivered to the crystallizer 60 and then evaporated, concentrated and crystallized, so as to obtain potassium chloride crystals and sodium chloride crystals meeting the industry performance standards.

In addition, it should be understood that, although this specification is described according to each implementation, each implementation may not comprise only one independent technical solution. The description manner of this specification is merely for clarity. This specification should be considered as a whole by a person skilled in the art, and the technical solution in each implementation may also be properly combined, to form other implementations that can be understood by a person skilled in the art.

A series of detailed descriptions listed above are only specific descriptions for the feasible implementations of the present invention, and are not used to limit the protection scope of the present invention. All equivalent implementations or modifications without departing from the technical spirit of the present invention should fall within the protection scope of the present invention.

What is claimed is:

1. A resource recovery method of desulfurized ash, comprising:
   a water washing process: washing desulfurized ash with water, a mass ratio of water to desulfurized ash is greater than 20:1, and performing solid-liquid separation to obtain solid residues rich in calcium sulfite and calcium sulfate and a solution rich in calcium hydroxide;
   a slurry preparation process: preparing the solution rich in calcium hydroxide into desulfurization slurry; and
   a roasting process: roasting the solid residues rich in calcium sulfite and calcium sulfate under the action of a reducing agent to obtain flue gas rich in sulfur dioxide and residues rich in calcium oxide.

2. The resource recovery method of desulfurized ash according to claim 1, wherein in the water washing process, the obtained solid residues are subjected to compression and drying dehydration pretreatment, wherein the drying temperature is 200-400° C.

3. The resource recovery method of desulfurized ash according to claim 1, wherein in the roasting process, the reducing agent is a reducing atmosphere.

4. The resource recovery method of desulfurized ash according to claim 3, wherein the reducing atmosphere is an atmosphere in which the volume fraction of carbon monoxide is 0-5% and the volume fraction of oxygen is less than 2%.

5. The resource recovery method of desulfurized ash according to claim 3, wherein the reducing atmosphere is an atmosphere in which the volume fraction of carbon monoxide is 0-2% and the volume fraction of oxygen is less than 2%.

6. The resource recovery method of desulfurized ash according to claim 1, wherein in the roasting process, the roasting temperature is 1000-1300° C.

7. The resource recovery method of desulfurized ash according to claim 1, wherein in the slurry preparation process, the prepared desulfurization slurry is used for flue gas desulfurization; and
   the resource recovery method further comprises:
   an analysis process: after performing the water washing process and the slurry preparation process for several cycles, adding sodium carbonate and/or potassium carbonate to the solution obtained in the next water washing process, performing solid-liquid separation to obtain a salt solution and solid phase precipitates rich in calcium carbonate, and evaporating, concentrating and crystallizing the salt solution.

8. The resource recovery method of desulfurized ash according to claim 1, further comprising a residue use process: adding the residues obtained in the roasting process to the solution in the slurry preparation process to prepare desulfurization slurry.

9. The resource recovery method of desulfurized ash according to claim 8, further comprising a residue reuse process: after performing the water washing process, the roasting process, the residue use process and the slurry preparation process for several cycles, using the residues obtained in the next roasting process as a fusing agent for iron ore sintering.

* * * * *